(12) United States Patent
Chen et al.

(10) Patent No.: US 9,885,927 B2
(45) Date of Patent: Feb. 6, 2018

(54) PIXEL ELECTRODE AND LIQUID CRYSTAL DISPLAY DEVICE

(71) Applicant: SHENZHEN CHINA STAR OPTOELECTRONICS TECHNOLOGY CO., LTD., Shenzhen (CN)

(72) Inventors: Cheng Hung Chen, Shenzhen (CN); Xiaohui Yao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,411

(22) PCT Filed: Dec. 30, 2014

(86) PCT No.: PCT/CN2014/095561
§ 371 (c)(1),
(2) Date: Apr. 20, 2016

(87) PCT Pub. No.: WO2016/095276
PCT Pub. Date: Jun. 23, 2016

(65) Prior Publication Data
US 2016/0238907 A1    Aug. 18, 2016

(30) Foreign Application Priority Data
Dec. 18, 2014  (CN) .......................... 2014 1 0802543

(51) Int. Cl.
G02F 1/1343      (2006.01)
G02F 1/1337      (2006.01)

(52) U.S. Cl.
CPC .. G02F 1/134336 (2013.01); G02F 1/133707 (2013.01); G02F 1/134309 (2013.01); *G02F 2001/134345* (2013.01)

(58) Field of Classification Search
CPC .. G02F 1/1337; G02F 1/136; G02F 1/134309; G02F 1/134363; G02F 1/133707; G02F 1/1368; G02F 1/134336; G02F 1/13624; G02F 1/133753; G02F 1/1343; G02F 1/1362; G02F 1/136213; G02F 2001/134345; G02F 2001/133757; G02F 2001/133742; G02F 2001/134372; G02F 2201/123; G02F 2201/52; G02F 2201/40; G02F 2201/124; G09G 3/3648;
(Continued)

(56) References Cited

U.S. PATENT DOCUMENTS

2013/0314640 A1* 11/2013 Kang .................... G02F 1/1337
349/61

* cited by examiner

*Primary Examiner* — Thoi Duong
(74) *Attorney, Agent, or Firm* — Buchanan Ingersoll & Rooney PC

(57) ABSTRACT

In the technical field of liquid crystal display, a pixel electrode and a liquid crystal display are provided. The pixel electrode comprises a first trunk and a second trunk formed as an elongated linear member, said first trunk and said second trunk being orthogonal to each other, and a plurality of branches each formed as an elongated linear member and extending from the first trunk or the second trunk, wherein an acute angle θ formed between either branch and the first trunk satisfies the following relationship: 0°<θ<45° or 45°<θ<90°.

4 Claims, 3 Drawing Sheets

(58) Field of Classification Search
CPC ............ G09G 3/36; G09G 2300/0447; G09G 2300/0426; G09G 2320/0209; G09G 2320/028
USPC ... 349/144, 43, 143, 139, 129, 130, 141, 38, 349/48
See application file for complete search history.

PIXEL ELECTRODE AND LIQUID CRYSTAL DISPLAY DEVICE

CROSS REFERENCE TO RELATED APPLICATION

The present application claims benefit of Chinese patent application CN 201410802543.5, entitled "PIXEL ELECTRODE AND LIQUID CRYSTAL DISPLAY" and filed on Dec. 18, 2014, which is incorporated herein by reference.

TECHNICAL FIELD

The present disclosure relates to the technical field of liquid crystal display, and in particular, to a pixel electrode and a liquid crystal display comprising the pixel electrode.

TECHNICAL BACKGROUND

A vertical display mode is one of the display modes of a liquid crystal display (LCD). In the vertical display mode, the liquid crystals will present different alignments when viewed from different viewing angles, resulting in color distortion under large viewing angle. At present, in conventional liquid crystal displays adopting the vertical display mode, the pixel electrode therein is divided into four regions.

Moreover, in order to reduce the color distortion under large viewing angle, the liquid crystal pixel is also divided into two parts, so that eight regions are formed. One part of the regions is a main area, and the other is a subarea. The distortion under large viewing angle can be reduced by controlling the voltages of the two parts, which is called low color cast design.

FIG. 1 shows an equivalent circuit of a common pixel unit adopting the low color cast design. A pixel unit is divided into a main area and a subarea. Two or more different thin film transistors are utilized to supply power for the main area and the subarea of the pixel unit. When a scan line 11 is activated, the thin film transistor $T_{main}$ in the main area and the thin film transistor $T_{sub}$ in the subarea will be turned on, so that electrical signals from a data line 13 are transmitted to a liquid crystal capacitor and a storage capacitor in the main area and the subarea of the pixel unit respectively. When the scan line 11 is deactivated and a charge sharing line 12 is activated, a shared thin film transistor $T_{cs}$ is turned on, and part of voltage in the liquid crystal capacitor $Clc_{sub}$ and the storage capacitor $CST_{sub}$ in the subarea is released into a shared capacitor Cb. In this way, a potential difference is presented between the main area and the subarea of the pixel unit, so that the color cast can be reduced with the aid of control.

However, in the low color cast design of the prior art, the pixel is divided into two parts, resulting in a reduced aperture ratio inevitably. In addition, the effective potential of liquid crystal in the main area is reduced, resulting in the loss of brightness in the main area. Consequently, the light transmittance of the liquid crystal display is negatively influenced.

In order to improve the display effect of the liquid crystal display, the present disclosure provides a new low color cast design scheme, which can be used to replace or combine with the low color cast design in the prior art.

SUMMARY OF THE INVENTION

The present disclosure provides a pixel electrode for solving the above-mentioned technical problem.

The pixel electrode according to the present disclosure comprises a first trunk and a second trunk each formed as an elongated linear member, said first trunk and said second trunk being orthogonal to each other, and a plurality of branches each formed as an elongated linear member and extending from the first trunk or the second trunk, wherein an acute angle θ formed between either branch and the first trunk satisfies the following relationship: 0°<θ<45° or 45°<θ<90°.

In general, liquid crystal is utilized as an optical switch to control the display for the liquid crystal display. The alignment of the liquid crystal can be controlled by the angles of the branches or silts of the pixel electrode, and the display under different viewing directions can be improved by controlling different alignments of the liquid crystal. Thus, the pixel electrode according to the present disclosure has significantly improved display quality under a specific viewing angle, and therefore has flexibility and adaptability in production and daily use.

Preferably, in a rectangular coordinate system consisting of an x axis formed by an extension direction of the first trunk and a y axis formed by an extension direction of the second trunk, the branches are arranged in each quadrant of the rectangular coordinate system.

Preferably, angles θ1, θ2, θ3 and θ4 formed between the branches in the first, second, third and fourth quadrants respectively and the positive direction of x axis along a counterclockwise direction satisfy the following relationships: 0°<θ1<45°, 135°<θ2<180°, 180°<θ3<225°, and 315°<θ4<360°. In this way, the angles formed between the branches of the pixel electrode and the horizontal direction (i.e. the left-right direction of the display) are reduced, thus improving the left and right viewing angles of the liquid crystal display adopting the pixel electrode. For domestic televisions, computer displays and the like, the display quality under the left and right viewing angles is prominently unsatisfactory, so that the preferred solution is especially suitable for this kind of display devices.

Preferably, angles θ1, θ2, θ3 and θ4 formed between the branches in the first, second, third and fourth quadrants respectively and the positive direction of x axis along a counterclockwise direction satisfy the following relationships: 45°<θ1<90°, 90°<θ2<135°, 225°<θ3<270°, and 270°<θ4<315°. In this way, the angles formed between the branches of the pixel electrode and the horizontal direction (i.e. the left-right direction of the display) are enhanced, thus improving the top and bottom viewing angles of the liquid crystal display adopting the pixel electrode. For liquid crystal displays disposed at high positions for display of public use, the display quality under the top and bottom viewing angles is prominently unsatisfactory, so that the preferred solution is especially suitable for this kind of display devices.

Preferably, angles θ1, θ2, θ3 and θ4 formed between the branches in the first, second, third and fourth quadrants respectively and the positive direction of x axis along a counterclockwise direction satisfy the following relationships: 0°<θ1<45°, 135°<θ2<180°, 225°<θ3<270°, and 270°<θ4<315°. In this way, different branch orientations are arranged in different pixel areas to improve the bottom, left, and right viewing angles of the liquid crystal display adopting the pixel electrode.

Preferably, in the rectangular coordinate system, the extension directions of the branches in the first and third quadrants respectively are the same, and/or the extension directions of the branches in the second and fourth quadrants respectively are the same.

Preferably, in the rectangular coordinate system, the branches in the same quadrant parallel to each other. This arrangement can save space and simplify process.

Preferably, in the rectangular coordinate system, different branches in the same quadrant form different angles with the first trunk. In this manner, a fine adjustment can be facilitated.

Preferably, the value of θ is one selecting from a group consisting of 10°, 20°, 30°, 40°, 50°, 60°, 70° and 80°.

The present disclosure further provides a liquid crystal display, comprising the pixel electrode according to the present disclosure.

The technical features mentioned herein may be combined with one another in any manner or replaced by equivalent variants, as long as the objectives of the present disclosure can be achieved.

BRIEF DESCRIPTION OF THE ACCOMPANYING DRAWINGS

The present disclosure will be explained in detail with reference to the embodiments and the accompanying drawings, wherein.

In the accompanying drawings, the same components are indicated with the same reference sign. The drawings are not drawn to actual scale.

DETAILED DESCRIPTION OF THE EMBODIMENTS

The present disclosure will be further explained with reference to the accompanying drawings.

The liquid crystal is utilized as an optical switch to control the display for the liquid crystal display, wherein the alignment of the liquid crystal can be controlled by the angles of the branches or silts of the pixel electrode, and the display under different viewing directions can be improved by controlling different alignments of the liquid crystal.

On the basis of the above recognition, the present disclosure provides a pixel electrode, which comprises a first trunk and a second trunk each formed as an elongated linear member, said first trunk and said second trunk being orthogonal to each other, and a plurality of branches each formed as an elongated linear member and extending from the first trunk or the second trunk, wherein an acute angle θ formed between either branch and the first trunk satisfies the following relationship: $0°<θ<45°$ or $45°<θ<90°$.

In a rectangular coordinate system consisting of an x axis formed by an extension direction of the first trunk and a y axis formed by an extension direction of the second trunk, the branches are arranged in each quadrant of the rectangular coordinate system.

Figure 1:
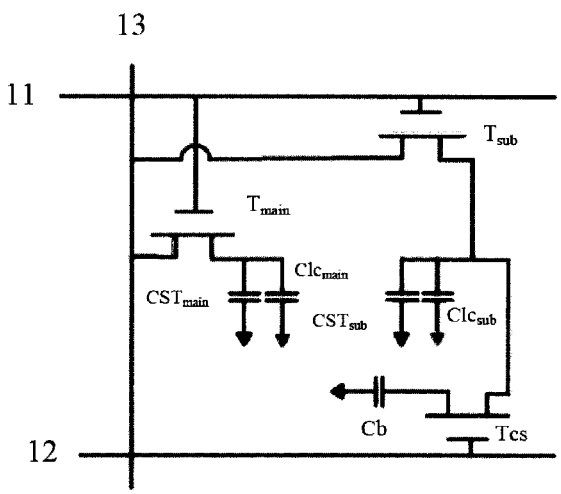
FIG. 1 shows an equivalent circuit of a traditional pixel unit utilizing low color cast design.
Figure 2:
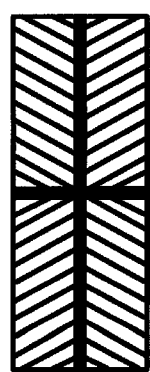
FIG. 2 shows a first embodiment of the pixel electrode according to the present disclosure.
Figure 2:
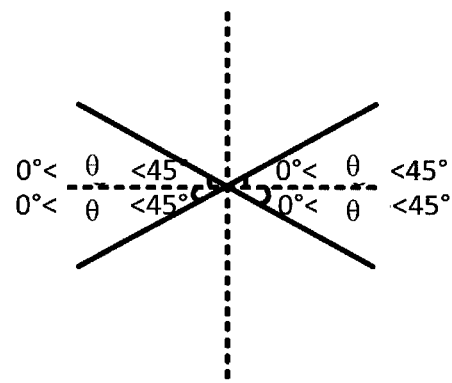

FIG. 2 shows a first embodiment of the pixel electrode according to the present disclosure. As shown in FIG. 2, in the first embodiment, the trunk extending along a horizontal direction forms a first trunk, and the trunk extending along a vertical direction forms a second trunk. It can be seen that angles $θ1, θ2, θ3$ and $θ4$ formed between the branches in the first, second, third and fourth quadrants respectively and the positive direction of x axis along a counterclockwise direction satisfy the following relationships: $0°<θ1<45°$, $135°<θ2<180°$, $180°<θ3<225°$, and $315°<θ4<360°$.

The following table 1 shows the feasible values of $θ1, θ2, θ3$ and $θ4$ of the first embodiment.

TABLE 1

| Angle | Feasible Values |
| --- | --- |
| θ1 | 10°, 20°, 30°, 40° |
| θ2 | 140°, 150°, 160°, 170° |
| θ3 | 190°, 200°, 210°, 220° |
| θ4 | 320°, 330°, 340°, 350° |

As shown in FIG. 2 clearly, in the first embodiment, in the rectangular coordinate system, the extension directions of the branches in the first and third quadrants respectively are the same, and the extension directions of the branches in the second and fourth quadrants respectively are the same. On the other hand, in the rectangular coordinate system, the branches in the same quadrant parallel to each other.

In the first embodiment, the angles formed between the branches of the pixel electrode and the horizontal direction (i.e. the left-right directions of the display) are reduced, thus improving the left and right viewing angles of the liquid crystal display adopting the pixel electrode. For domestic televisions, computer displays and the like, the display quality under left and right viewing angles is prominently unsatisfactory, so that the pixel electrode in the first embodiment of the present disclosure is especially suitable for this kind of display devices. Thus, the pixel electrode according to the present disclosure has significantly improved display quality under a specific viewing angle, and therefore has flexibility and adaptability in production and daily use.

Figure 3:
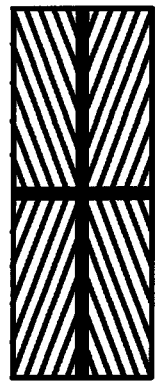
FIG. 3 shows a second embodiment of the pixel electrode according to the present disclosure.
Figure 3:
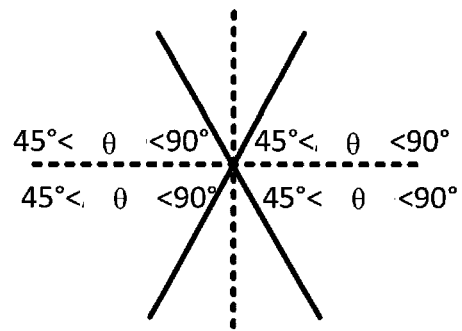

FIG. 3 shows a second embodiment of the pixel electrode according to the present disclosure. As shown in FIG. 3, in the second embodiment, the trunk extending along a horizontal direction forms a first trunk, and the trunk extending along a vertical direction forms a second trunk. It can be seen that angles $θ1, θ2, θ3$ and $θ4$ formed between the branches in the first, second, third and fourth quadrants respectively and the positive direction of x axis along a counterclockwise direction satisfy the following relationships: $45°<θ1<90°$, $90°<θ2<135°$, $225°<θ3<270°$, and $270°<θ4<315°$.

The following table 2 shows the feasible values of $θ1, θ2, θ3$ and $θ4$ of the second embodiment.

TABLE 2

| Angle | Feasible Values |
| --- | --- |
| θ1 | 50°, 60°, 70°, 80° |
| θ2 | 100°, 110°, 120°, 130° |
| θ3 | 230°, 240°, 250°, 260° |
| θ4 | 280°, 290°, 300°, 310° |

As shown in FIG. 3 clearly, in the second embodiment, in the rectangular coordinate system, the extension directions of the branches in the first and third quadrants respectively are the same, and the extension directions of the branches in the second and fourth quadrants respectively are the same. On the other hand, in the rectangular coordinate system, the branches in the same quadrant parallel to each other.

In the second embodiment, the angles formed between the branches of the pixel electrode and the horizontal direction (the left-right directions of the display) are enhanced, thus improving the top and bottom viewing angles of the liquid crystal display adopting the pixel electrode. For liquid crystal displays disposed at high positions for display of public use, the display quality under top and bottom viewing angles is prominently unsatisfactory, so that the pixel electrode in the second embodiment of the present disclosure is especially suitable for this kind of display devices. Thus, the pixel electrode according to the present disclosure has significantly improved display quality under a specific viewing angle, and therefore has flexibility and adaptability in production and daily use.

Figure 4:
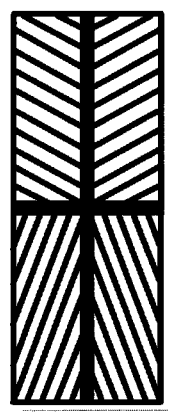
FIG. 4 shows a third embodiment of the pixel electrode according to the present disclosure.
Figure 4:
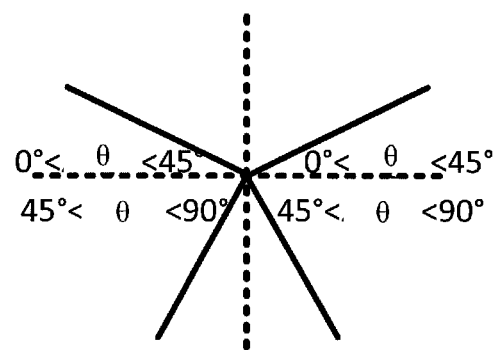

FIG. 4 shows a third embodiment of the pixel electrode of the present disclosure. As shown in FIG. 4, in the third embodiment, the trunk extending along a horizontal direction forms a first trunk, and the trunk extending along a vertical direction forms a second trunk. It can be seen that angles θ1, θ2, θ3 and θ4 formed between the branches in the first, second, third and fourth quadrants respectively and the positive direction of x axis along a counterclockwise direction satisfy the following relationships: 0°<θ1<45°, 135°<θ2<180°, 225°<θ3<270°, and 270°<θ4<315°.

The following table 3 shows the feasible values of θ1, θ2, θ3 and θ4 of the third embodiment.

TABLE 3

| Angle | Feasible Values |
| --- | --- |
| θ1 | 10°, 20°, 30°, 40° |
| θ2 | 140°, 150°, 160°, 170° |
| θ3 | 230°, 240°, 250°, 260° |
| θ4 | 280°, 290°, 300°, 310° |

As shown in FIG. 4 clearly, in the third embodiment, in the rectangular coordinate system, the branches in the same quadrant parallel to each other.

In the third embodiment, different branch orientations are arranged in different pixel areas to improve the bottom, left and right viewing angles of the liquid crystal displays adopting the pixel electrode. Thus, the pixel electrode according to the present disclosure has significantly improved display quality under a specific viewing angle, and therefore has flexibility and adaptability in production and daily use.

However, it is to be understood that the above three embodiments are merely illustrative, rather than limitations to the present disclosure.

In addition, in other embodiments, in the rectangular coordinate system, different branches in the same quadrant can form different angles with the first trunk. In this way, a more accurate control can be achieved.

Figure 5:
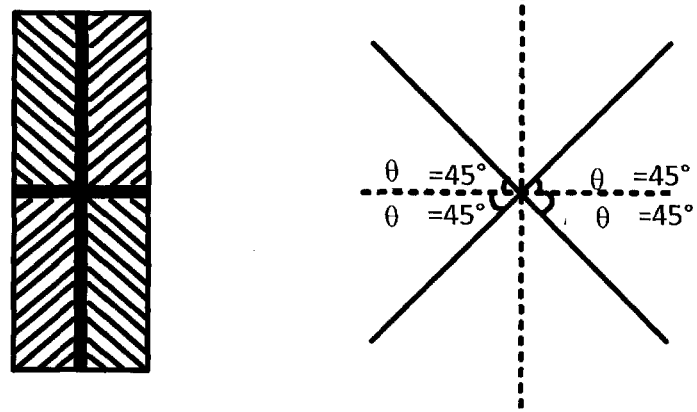
FIG. 5 shows the pixel electrode of a comparison embodiment.

FIG. 5 shows the pixel electrode of the comparison embodiment. In the comparison embodiment shown in FIG. 5, the pixel electrode comprises a first trunk and a second trunk each formed as an elongated linear member, said first trunk and said second trunk being orthogonal to each other, and a plurality of branches each formed as an elongated linear member and extending from the first trunk or the second trunk, wherein an acute angle θ formed between either branch and the first trunk is 45°. As the first and second trunks are orthogonal to each other, the acute angle formed between either branch and the first trunk is also 45°.

It can be understood that in the comparison embodiment in FIG. 5, the structure of the pixel electrode is symmetrical in eight directions, and the angles formed between its branches and both the first and the second trunks are all 45°. Thus, the display effects of the liquid crystal display adopting the pixel electrode in the comparison embodiment are uniform under every viewing angle, so that there is no prominent advantage under a specific viewing angle.

However, for different liquid crystal displays, people's requirements on the viewing angles in different directions are various. For example, for domestic televisions, people are more concerned about the left and right viewing angles, while for liquid crystal displays disposed at high positions for display of public use, people are more concerned about the top and bottom viewing angles. Thus, the display effects of the liquid crystal display adopting the pixel electrode in the comparison embodiment are uniform under every viewing angle, presenting no prominent advantage under a specific viewing angle. Consequently, in practical production and use, there is no prominent advantage for the pixel electrode according to the comparison embodiment. The liquid crystal display adopting the pixel electrode in the comparison embodiment cannot meet different visual demands flexibly, and its production process is rigid and its display effect is far from satisfactory, thus affecting the whole quality of the liquid crystal display and increasing the production cost indirectly.

On the contrary, the liquid crystal display adopting the pixel electrode according to the present disclosure can greatly improve the display effect under a specific viewing angle (typically, for example the left and right viewing angles and the top and bottom viewing angles of a display). Thus, the pixel electrode of the present disclosure can effectively meet the demands of different liquid crystal displays. The liquid display with the above pixel electrode has the advantages of flexible production process and better display effect.

The present disclosure further provides a liquid crystal display, comprising the pixel electrode according to the present disclosure.

Although the present disclosure has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A pixel electrode, comprising:
    a first trunk and a second trunk each formed as an elongated linear member, said first trunk and said second trunk being orthogonal to each other, and
    a plurality of branches each formed as an elongated linear member and extending from the first trunk or the second trunk,
    wherein an acute angle θ formed between either branch and the first trunk satisfies the following relationship: 0°<θ<45° or 45°<θ<90°,
    wherein in a rectangular coordinate system consisting of an x axis formed by an extension direction of the first trunk and a y axis formed by an extension direction of the second trunk, the branches are arranged in each quadrant of the rectangular coordinate system, and
    wherein angles θ1, θ2, θ3 and θ4 formed between the branches in the first, second, third and fourth quadrants respectively and the positive direction of x axis along a counterclockwise direction satisfy the following relationships: $0°<\theta1<45°$, $135°<\theta2<180°$, $225°<\theta3<270°$, and $270°<\theta4<315°$.

2. The pixel electrode according to claim 1, wherein in the rectangular coordinate system, the branches in the same quadrant parallel to each other.

3. The pixel electrode according to claim 1, wherein the value of $\theta$ is one selecting from a group consisting of 10°, 20°, 30°, 40°, 50°, 60°, 70° and 80°.

4. A liquid crystal display, comprising a pixel electrode, said pixel electrode comprising:
- a first trunk and a second trunk each formed as an elongated linear member, said first trunk and said second trunk being orthogonal to each other, and
- a plurality of branches each formed as an elongated linear member and extending from the first trunk or the second trunk,
- wherein an acute angle $\theta$ formed between the branches and the first trunk satisfies the following relationship: $0°<\theta<45°$ or $45°<\theta<90°$,
- wherein in a rectangular coordinate system consisting of an x axis formed by an extension direction of the first trunk and a y axis formed by an extension direction of the second trunk, the branches are arranged in each quadrant of the rectangular coordinate system, and
- wherein angles $\theta1$, $\theta2$, $\theta3$ and $\theta4$ formed between the branches in the first, second, third and fourth quadrants respectively and the positive direction of x axis along a counterclockwise direction satisfy the following relationships: $0°<\theta1<45°$, $135°<\theta2<180°$, $225°<\theta3<270°$, and $270°<\theta4<315°$.

* * * * *